United States Patent [19]

Foster

[11] Patent Number: 5,505,292
[45] Date of Patent: Apr. 9, 1996

[54] RECIPROCATING CONVEYOR SLATS WITH POINTED RIDGES FOR SUPPORTING PALLETS

[76] Inventor: Raymond K. Foster, P.O. Box 1, Madras, Oreg. 97741

[21] Appl. No.: 414,777

[22] Filed: Mar. 31, 1995

[51] Int. Cl.⁶ ............................................. B65G 25/04
[52] U.S. Cl. ............................................. 198/750.2
[58] Field of Search ........................ 198/750.2, 750.3, 198/750.4, 750.5

[56] References Cited

U.S. PATENT DOCUMENTS

| | | | |
|---|---|---|---|
| 4,144,963 | 3/1979 | Hallstrom | 198/750.3 |
| 4,184,587 | 1/1980 | Hallstrom | 198/750.2 |
| 4,492,303 | 1/1985 | Foster | 198/750.4 X |
| 4,679,686 | 7/1987 | Foster | 198/750.4 X |
| 4,785,929 | 11/1988 | Foster | 198/750.4 |
| 4,858,748 | 8/1989 | Foster | 198/750.4 |
| 4,907,691 | 3/1990 | Foster | 198/750.2 |
| 4,940,132 | 7/1990 | Foster | 198/750 |
| 4,962,848 | 10/1990 | Foster | 198/750.2 |
| 5,125,502 | 6/1992 | Foster | 198/750.3 |
| 5,222,592 | 6/1993 | Quaeck | 198/750.3 |
| 5,228,556 | 7/1993 | Quaeck | 198/750.3 |
| 5,303,816 | 4/1994 | Foster | 198/750 |
| 5,335,778 | 8/1994 | Wilkens | 198/750.3 |

*Primary Examiner*—D. Glenn Dayoan
*Attorney, Agent, or Firm*—Joan H. Pauly

[57] ABSTRACT

A reciprocating conveyor floor slat has an upper portion with an upper surface and at least one longitudinally extending ridge projecting upwardly from the upper surface. The ridge has a longitudinally extending pointed top portion positioned to engage a bottom surface of an article placed on the slat. The pointed top portion is spaced above the top surface a distance sufficient to maintain the bottom surface of the article out of contact with the slat's upper surface as the article is being conveyed. The preferred number of ridges per slat is two, with the ridges projecting upwardly from laterally opposite portions of the upper surface. Preferably, the bottom surface of the article being conveyed remains at least about 90% out of contact with the slat. When articles such as wooden pallets are conveyed, the pointed top portions of the ridges dig into the bottom surfaces of the pallets to form longitudinal grooves to guide longitudinal movement of the pallets. The low percentage of the area of the bottom surface that contacts the slats minimizes the likelihood of the bottom surface hanging up on the slats.

8 Claims, 3 Drawing Sheets

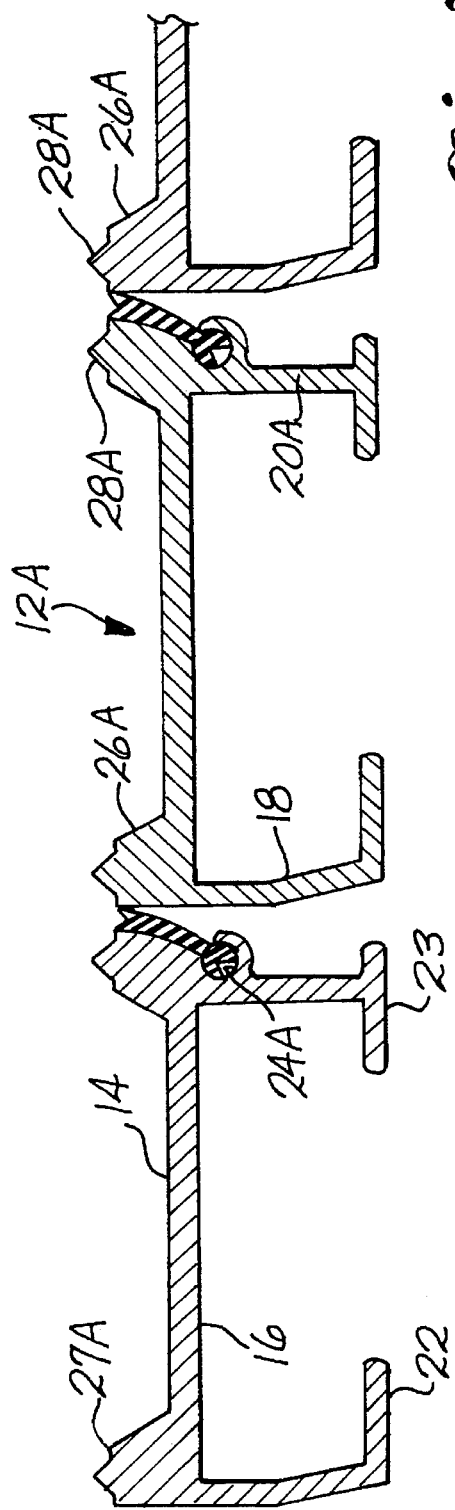
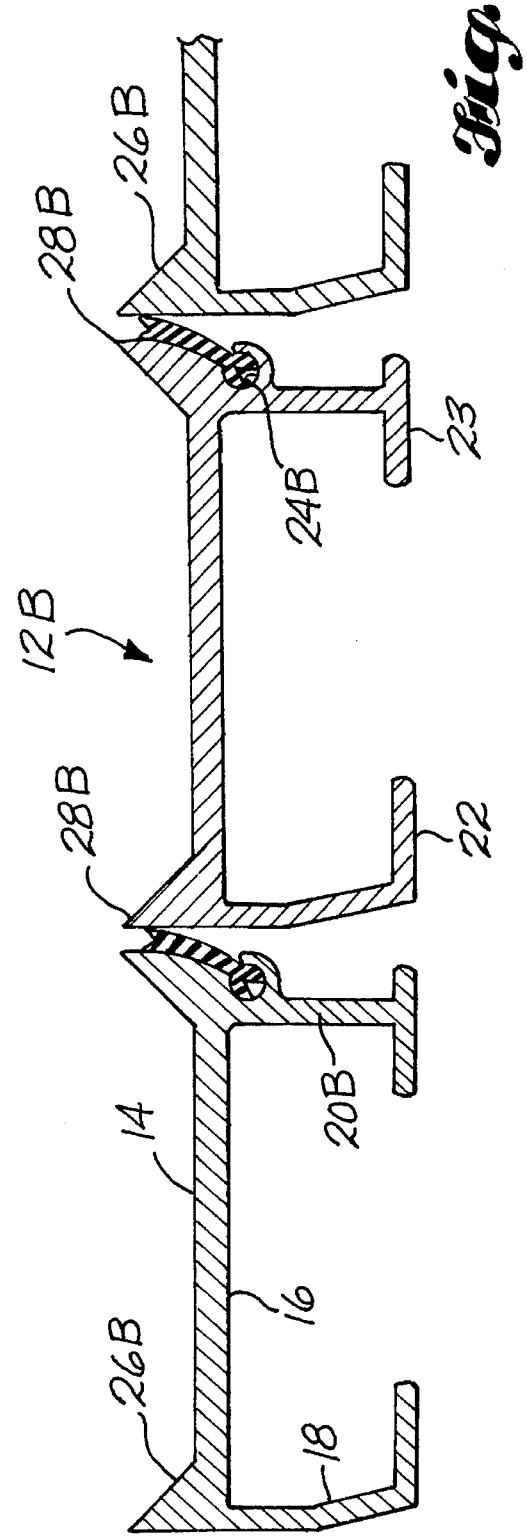

5,505,292

RECIPROCATING CONVEYOR SLATS WITH POINTED RIDGES FOR SUPPORTING PALLETS

TECHNICAL FIELD

This invention relates to floor slats for reciprocating conveyors and, more particularly, to a floor slat having one or more pointed ridges for conveying articles on the conveyor while minimizing the area of contact between the bottom surfaces of the articles and the conveyor slats.

BACKGROUND INFORMATION

Reciprocating slat conveyors are widely used for conveying various types of material and articles. The different types of materials and articles present different sets of problems in relation to reciprocating conveyors. For example, a major problem that is encountered in connection with the conveying of wooden pallets is the tendency for the pallets to snag on the conveyor slats. Wooden pallets are generally fairly rough structures with rough bottom surfaces. The wood on the bottom surfaces is frequently uneven, and it is not uncommon for nails to be sticking out of the bottom surfaces. These and other irregularities in the bottom surfaces create high spots that tend to hang up on the conveyor slats.

FIGS. 2 and 3 show two prior conveyor slats 2, 4 that were designed to convey pallets. Each of the slats 2, 4 has a plurality of longitudinal ridges 6 with triangular cross sections. These triangular ridges 6 were intended to dig into the bottom surface of a pallet and form grooves along which the pallet would move. The vertical extent of the ridges 6 is about ⅛ inch. The operational characteristics of the slats 2, 4 were not very satisfactory. Pallets placed on the slats 2, 4 do not reliably ride on the grooves in the pallet bottom surface formed by the ridges 6. In addition, the bottoms of the pallets are not effectively held out of contact with the upper surface 8, 10 of the slat 2, 4 between the ridges 6. Therefore, avoidance of the problem of the pallets hanging up on the slats is only partially, if at all, achieved.

SUMMARY OF THE INVENTION

A subject of the invention is a floor slat for use in a reciprocating slat conveyor of a type having a plurality of adjacent floor slats mounted to be selectively reciprocated longitudinally of the conveyor. According to an aspect of the invention, the slat comprises an upper portion and a lower portion. The upper portion has an upper surface and at least one longitudinally extending ridge projecting upwardly from the upper surface. The ridge includes a longitudinally extending pointed top portion positioned to engage the bottom surface of an article placed on the slat. The top portion is spaced above the top surface a distance sufficient to maintain the bottom surface of the article out of contact with the upper surface of the slat as the article is being conveyed by the conveyor. The lower portion of the slat is configured to engage a support to guide reciprocating movement of the slat.

The details of the configuration of the ridges and the number of ridges per slat may be varied. In the currently preferred embodiments of the invention, there is a laterally spaced pair of ridges on each slat. Preferably, the ridges project upwardly from laterally opposite portions of the upper surface. The dimensioning of the slat upper surface and the ridge or ridges of the slat are preferably such that the bottom surface of an article vertically adjacent to the slat is maintained at least about 90% out of contact with the slat. This minimizes friction between the slat and the article and greatly reduces the likelihood of the pallet hanging up on the slats.

Another subject of the invention is a method of conveying a pallet on a reciprocating slat conveyor of a type having a plurality of adjacent floor slats mounted to be selectively reciprocated longitudinally of the conveyor. According to an aspect of the invention, the method comprises providing each slat of the conveyor with a longitudinally extending ridge projecting upwardly from an upper surface of the slat, said ridge including a longitudinally extending pointed top portion. A pallet is placed on the conveyor in a position in which it is supported by a plurality of the ridges. The ridges are dimensioned to have a height sufficient to maintain a pallet supported by a plurality of the ridges out of contact with the slat upper surface. The conveyor is operated to convey the pallet placed in such position. The operation includes allowing the top portions of the ridges to dig into the bottom surface of the pallet to form longitudinal grooves to guide longitudinal movement of the pallet. Preferably, while the conveyor is being operated to convey the pallet, the bottom surface of the pallet is maintained at least about 90% out of contact with the slats.

BRIEF DESCRIPTION OF THE DRAWINGS

In the drawings, like element designations refer to like parts throughout, and:

FIGS. 5 and 6 are like FIG. 4 except that they show two additional preferred embodiments of the invention.

BEST MODES FOR CARRYING OUT THE INVENTION

FIGS. 1 and 4–6 show three floor slats 12, 12A, 12B that are constructed according to the invention and that constitute the best modes of the apparatus of the invention currently known to the applicant. The illustrated floor slats 12, 12A, 12B also constitute the best modes of apparatus for carrying out the method of the invention currently known to the applicant.

Figure 1:
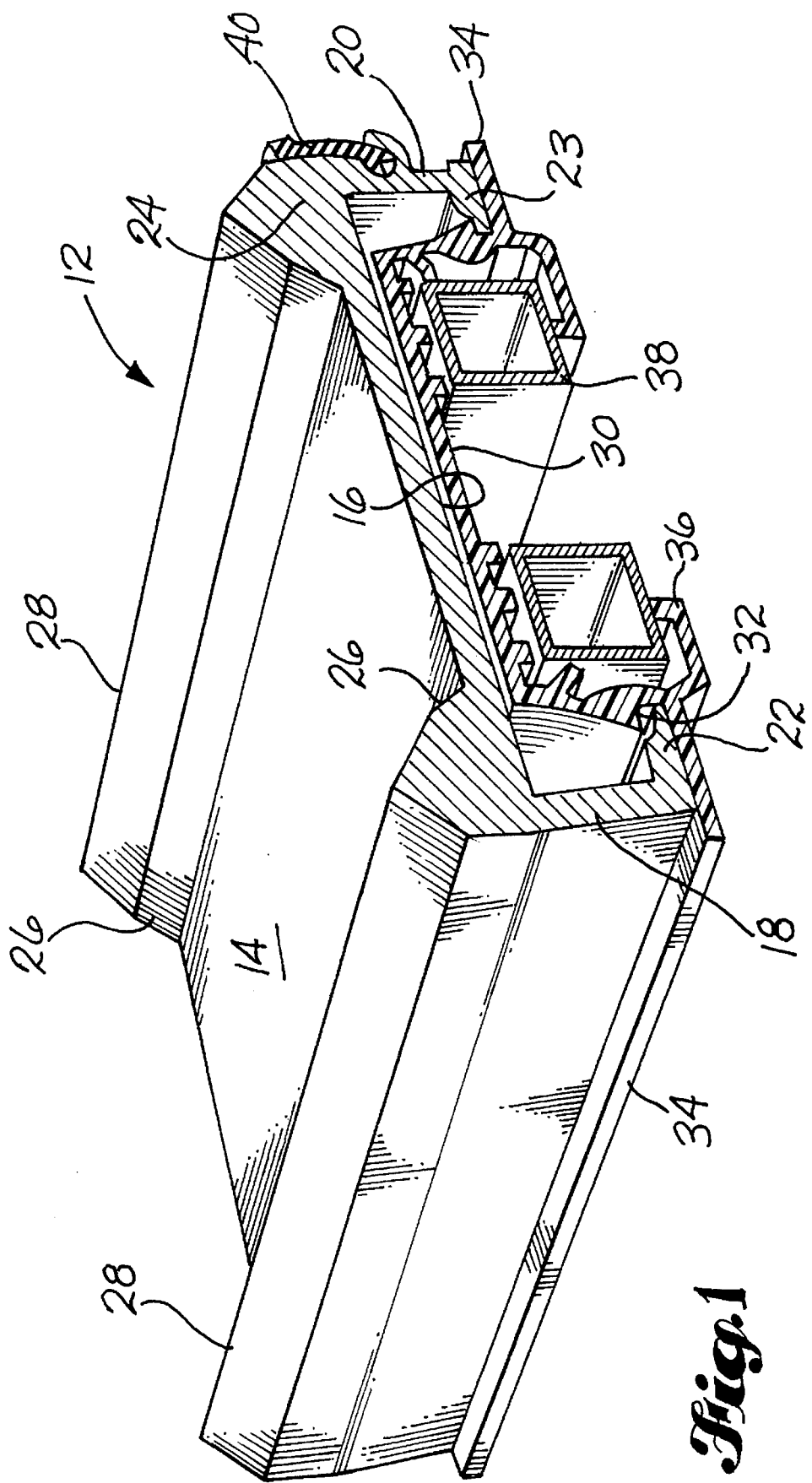
FIG. 1 is a pictorial view of a first preferred embodiment of the slat of the invention mounted on two guide tubes by means of a bearing, with one end of the elements shown in section.
Figure 2:
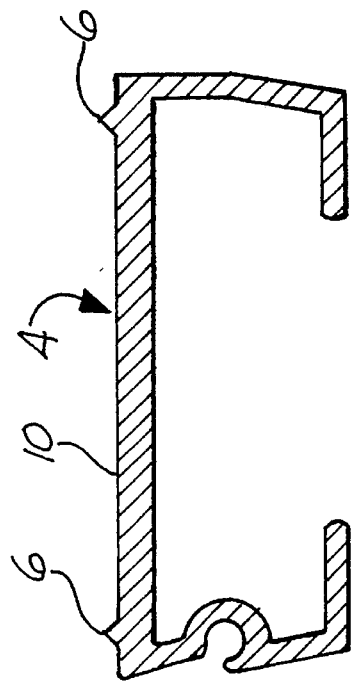
FIGS. 2 and 3 are cross-sectional views of two previous floor slat designs.
Figure 3:
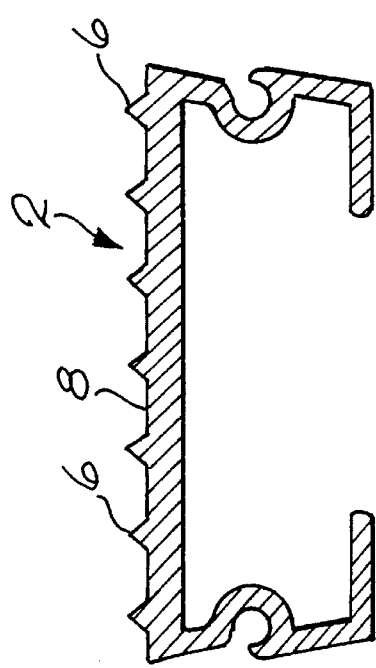
Figure 4:
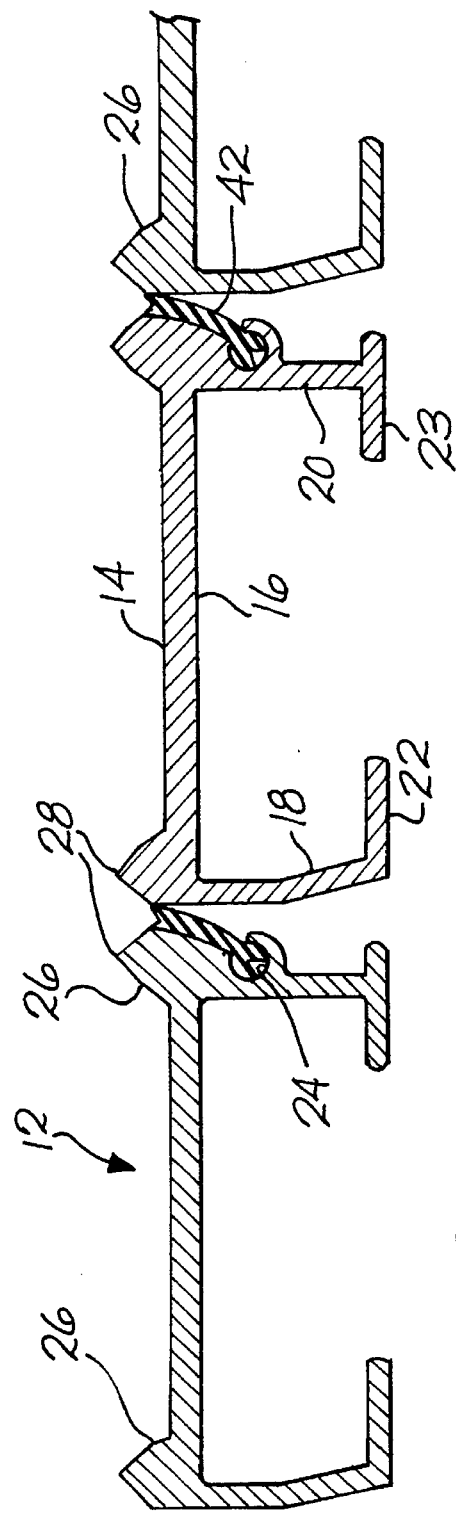
FIG. 4 is a cross-sectional view of a plurality of the slats shown in FIG. 1 positioned adjacent to each other.

Referring to FIGS. 1 and 4, the first preferred embodiment of the slat 12 comprises a unitary slat body made from, for example, extruded aluminum. The slat body includes a top portion having a top surface 14 and an opposite lower surface 16. A pair of legs 18, 20 depend downwardly from opposite side edge portions of the top portion of the slat 12. The legs 18, 20 terminate in lower flanges 22, 23, respectively. The flanges 22, 23 extend horizontally inwardly toward each other. A longitudinally extending seal recess 24 is formed in the leg 20 adjacent to the top portion.

In accordance with the invention, the slat 12 includes at least one longitudinally extending ridge projecting upwardly from the upper surface 14. The number of ridges on a slat 12 may be varied without departing from the spirit and scope of the invention. As shown in FIGS. 1 and 4, the slat 12 is provided with a pair of ridges 26. The slat could also have additional ridges or only have a single ridge, which could, for example, be positioned along the longitudinal center line of the slat 12. When a pair of ridges is provided, they are preferably laterally spaced apart, and most preferably project upwardly from laterally opposite portions of the upper surface 14, as shown in FIGS. 1 and 4. Regardless of the number of ridges, each ridge includes a longitudinally extending pointed top portion 28.

The slat of the invention is designed for use in a reciprocating slat conveyor of a type having a plurality of adjacent floor slats mounted to be selectively reciprocated longitudinally of the conveyor. FIG. 1 shows the first preferred embodiment of the slat 12 in its use position relative to additional conveyor components. The slat 12 is snap fit down onto a bearing 30. The bearing 30 has an upper bearing surface that slidably engages the lower surface 16 of the top portion of the slat 12 to slidably support the slat 12 during operation of the conveyor. The illustrated bearing 30 is of the type disclosed in the applicant's U.S. Pat. Nos. 4,785,929 and 4,940,132. Opposite legs extend downwardly from the upper portion of the bearing 30 with each of the legs having a downwardly facing shoulder 32 formed on its outer surface. At the bottom of each leg, a wing 34 extends laterally outwardly and a flange 36 extends laterally inwardly. When the slat 12 is snap fit down onto the bearing 30, the bearing legs bend inwardly an amount sufficient to allow the lower flanges 22, 23 of the slat 12 to snap down into the spaces formed between the bearing shoulders 32 and wings 34. This secures the slat 12 against upward movement relative to the bearing 30.

The bearing 30 is snap fit down onto a pair of guide/support tubes 38. The flanges 36 of the bearing 30 bend to allow them to snap down under the tubes 38. The tubes are commonly one inch by one inch tubes that are secured to and form part of the basic support structure for the conveyor. Loads imposed on the slat 12 by articles being conveyed are supported by the underlying support structure via the bearing 30 and its engagement with the lower surface 16 of the slat 12 and the engagement between the slat flanges 22, 23 and the bearing wings 34. As shown in FIG. 1, a seal 40 of a type disclosed in my aforementioned U.S. Pat. No. 4,940,132 is positioned with one end in the seal recess 24 in the slat leg 20 to sealingly engage an adjacent slat. FIG. 4 shows an alternative seal 42 that may be used with the slat 12. This seal 42 has a forked upper end and is of the type disclosed in my U.S. Pat. No. 5,303,816.

FIGS. 5 and 6 show two additional preferred embodiments 12A, 12B of the slat of the invention. In FIGS. 5 and 6, elements of the slats 12A, 12B that are essentially identical to the corresponding elements of slat 12 shown in FIGS. 1 and 4 are given the same reference numerals as in FIGS. 1 and 4. Elements having differing characteristics are designated by a corresponding numeral with the addition of the letter A in FIG. 5 or B in FIG. 6. The primary difference between the different embodiments of the slat is in the details of the configuration of the ridges projecting upwardly from the upper surface.

Referring to FIGS. 1 and 4, the lower portion of the ridge 26 has a first relatively small taper. Partway up the ridge 26, the taper increases on both sides of the ridge 26 and extends to the point 28 at the top of the ridge 26.

Referring to FIG. 5, the ridge 26A on the slat 12A also has a relatively slight taper on its lower portion. In this case, the slightly tapered portion of the ridge 26A constitutes the major portion of the ridge 26A and terminates in a horizontal step 27A. The upper portion of the ridge 26A comprises a triangular point that projects upwardly from the step 27A. This triangular portion of the ridge 26A forms the pointed top portion 28A that is characteristic of the slat of the invention.

Referring to FIG. 6, the ridge 26B in the third embodiment of the slat 12B has an essentially right triangular cross section. The laterally outer side of the ridge 26B is substantially vertical. The inner lateral side of the ridge 26B tapers outwardly to meet the laterally outer side at the pointed top 28B.

An additional difference between the slats 12A, 12B shown in FIGS. 5 and 6 and the slat 12 shown in FIGS. 1 and 4 is in the details of one of the slat legs 20, 20A, 20B. Because of the differences in the configurations of the ridges 26, 26A, 26B, the seal recesses 24A, 24B in the second and third embodiments is higher up on the leg 20A, 20B than the seal recess 24 is on the leg 20 of the slat 12.

Whatever the details of the ridge configuration, the ridge or ridges on the slat of the invention are preferably integrally formed with the slat body. The pointed top portion of the ridge is positioned to engage a bottom surface of an article placed on the slat and is spaced above the upper surface 14 of the slat a distance sufficient to maintain the bottom surface of the article out of contact with the upper surface 14 of the slat as the article is being conveyed by the conveyor. Preferably, the ridge or ridges and upper surface of the slat are dimensioned to maintain portions of the article's bottom surface vertically adjacent to the slat at least about 90% out of contact with the slat.

As used herein, the term "pointed" means that the top of the ridge comes to a sufficiently sharp point so that the top portion of the ridge will dig into the bottom of a standard wooden pallet when the pallet is placed on the conveyor to be conveyed by the conveyor. The extent to which the pointed top digs into the bottom of the pallet is generally less than ⅛ inch. Therefore, suitable dimensions for the slat ridges include a ⅛ inch height for the triangular pointed top portion 28A of the slat shown in FIG. 5. They also include an overall height of the ridge of about ⅝ inch. These dimensions are stated herein solely for the purpose of giving examples of what is anticipated will be typical dimensions of the ridges on slats made in accordance with the invention. Actual dimensions of slats of the invention may vary without departing from the spirit and scope of the invention.

In the use of the slat of the invention and the practice of the method of the invention, a plurality of slats are incorporated into a reciprocating slat conveyor of the type disclosed in my above-cited patents. The mounting arrangements may be varied. It is currently anticipated that the preferred mounting arrangement will be of the type illustrated in FIGS. 1 and 4–6. Preferably, the slats that are incorporated into the conveyor have one of the slat configurations shown in FIGS. 1 and 4, 5, or 6.

When the conveyor has been fully assembled and it is desired to convey a pallet, the pallet is placed on the conveyor in a position in which it is supported by a plurality of the ridges 26, 26A, 26B. As noted above, the ridges 26, 26A, 26B are dimensioned so that their height is sufficient to maintain the pallet placed on the conveyor out of contact with the slat's upper surface 14. When a pallet or pallets have been so placed on the conveyor, the conveyor is operated to convey the pallet or pallets. As the conveyor is operated, the mounting of the slats by the bearings 30 and guide tubes 38 supports the slats 12, 12A, 12B and the load carried thereby and guides reciprocating movement of the slats 12, 12A, 12B. The weight of each pallet and the pointed configuration of the tops of the ridges 26, 26A, 26B causes the top portions 28, 8A, 28B of the ridges 26, 26A, 26B to dig into the bottom surface of the pallet to form longitudinal grooves in the bottom surface. These grooves serve to guide longitudinal movement of the pallet resulting from operation of the conveyor. Preferably, the bottom surface of the pallet remains at least about 90% out of contact with the conveyor slats 12, 12A, 12B while the pallet is being conveyed. This helps to prevent any snagging of the pallet on the slats 12, 12A, 12B and helps maintain smooth longitudinal movement of the pallet along the conveyor in the intended conveying direction.

It is anticipated that the primary use of the slat of the invention will be to convey pallets, as described herein. However, the slat of the invention may also be used to convey other types of loads, including other discrete articles and loose knit materials, such as garbage or hay.

Although the preferred embodiments of the invention have been illustrated and described herein, it is intended to be understood by those skilled in the art that various modifications and omissions in form and detail may be made without departing from the spirit and scope of the invention as defined by the following claims.

What is claimed is:

1. For use in a reciprocating slat conveyor of a type having a plurality of adjacent floor slats mounted to be selectively reciprocated longitudinally of the conveyor, a floor slat comprising:

an upper portion having an upper surface and at least one longitudinally extending ridge projecting upwardly from said upper surface, said ridge including a longitudinally extending pointed top portion that is positioned to engage a bottom surface of an article placed on the slat and is spaced above said top surface a distance sufficient to allow said top portion to dig into said bottom surface up to about ⅛ inch and, at the same time, maintain at least a substantial portion of said bottom surface out of contact with said upper surface as the article is being conveyed by the conveyor; and a lower portion configured to engage a support to guide reciprocating movement of the slat.

2. The floor slat of claim 1, in which said ridge and said upper surface are dimensioned to maintain portions of said bottom surface vertically adjacent to the slat at least about 90% out of contact with the slat.

3. The floor slat of claim 1, comprising a pair of said ridges projecting upwardly from laterally opposite portions of said upper surface.

4. The floor slat of claim 3, in which said ridges and said upper surface are dimensioned to maintain portions of said bottom surface vertically adjacent to the slat at least about 90% out of contact with the slat.

5. The floor slat of claim 1, comprising a pair of said ridges laterally spaced apart from each other.

6. The floor slat of claim 5, in which said ridges and said upper surface are dimensioned to maintain portions of said bottom surface vertically adjacent to the slat at least about 90% out of contact with the slat.

7. A method of conveying a pallet on a reciprocating slat conveyor of a type having a plurality of adjacent floor slats mounted to be selectively reciprocated longitudinally of the conveyor, comprising:

providing each slat of the conveyor with a longitudinally extending ridge projecting upwardly from an upper surface of the slat, said ridge including a longitudinally extending pointed top portion;

placing a pallet on the conveyor in a position in which it is supported by a plurality of said ridges;

operating the conveyor to convey the pallet placed in said position, including allowing said top portions of said ridges to dig into the bottom surface of the pallet to form longitudinal grooves to guide longitudinal movement of the pallet; and dimensioning said ridges to have a height sufficient to allow said top portions to dig into the bottom surface of a pallet in said position up to about ⅛ inch and, at the same time, maintain at least a substantial portion of the bottom surface out of contact with said upper surface.

8. The method of claim 7, comprising, while operating the conveyor to convey the pallet, maintaining the bottom surface of the pallet at least about 90% out of contact with the slats.

* * * * *